UNITED STATES PATENT OFFICE.

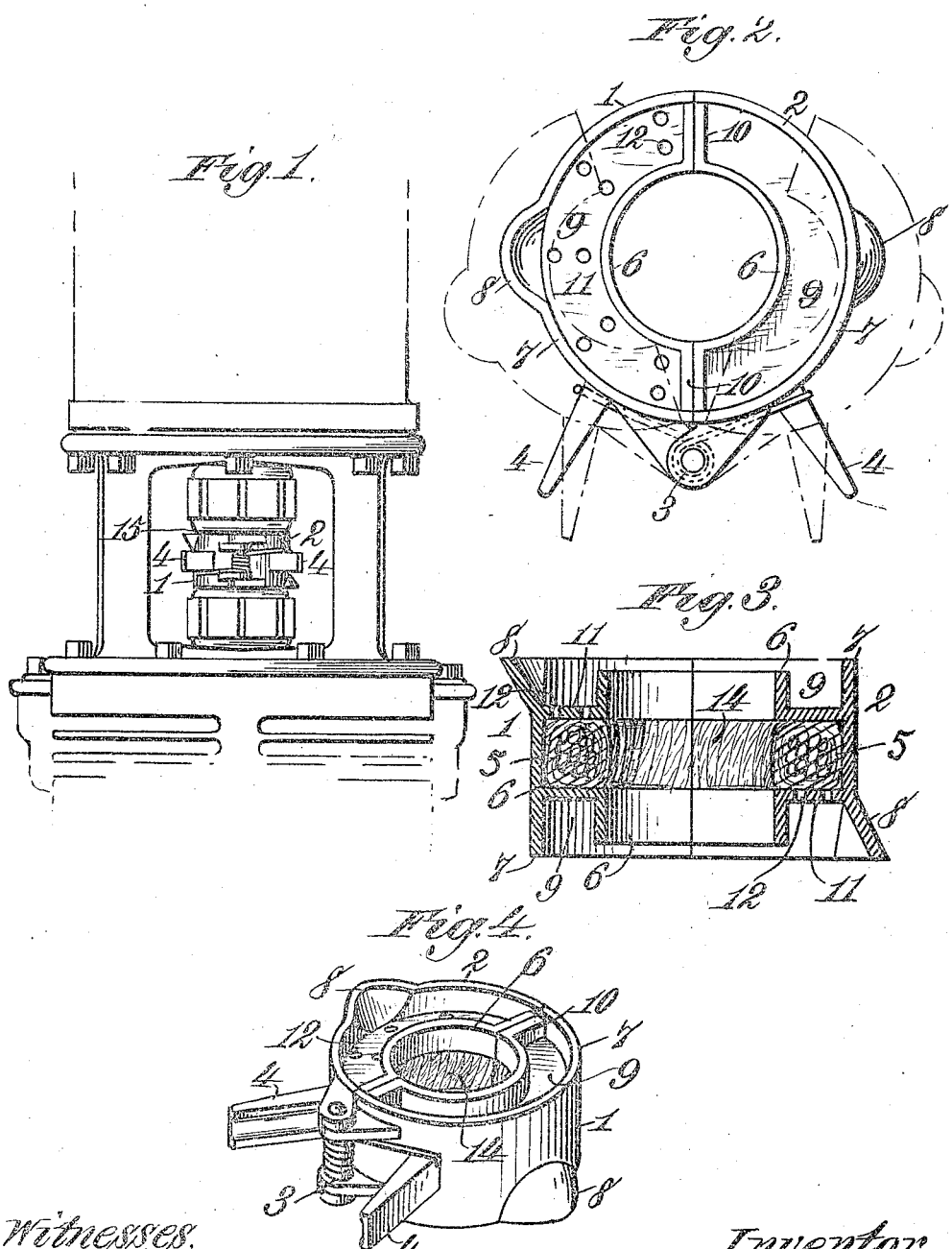

JAMES W. EVENS, OF BIRMINGHAM, ALABAMA.

SWAB FOR PISTON-RODS.

No. 889,669.  Specification of Letters Patent.  Patented June 2, 1908.

Application filed August 6, 1907. Serial No. 387,263.

*To all whom it may concern:*

Be it known that I, JAMES W. EVENS, a citizen of the United States, residing at Birmingham, Jefferson county, Alabama, have invented certain new and useful Improvements in Swabs for Piston-Rods, of which the following is a specification.

This invention relates to a piston swab which has been devised for use with an air pump or analogous piston rod, but adapted to be generally applied as a lubricating means to any mechanical part where it may practically perform its intended function.

The primary object of the invention is to produce a reversible swab capable of being applied with either end uppermost and having means in reverse position to permit entrance of the lubricant, which may be supplied to either end of the interior thereof, and to prevent the lubricant from leaking or dripping from the lower side of the device when in working position.

A further object of the invention is to so construct a swab that it will not only serve efficiently as a lubricating means, but will also operate to prevent the spanner or limiting nuts of a piston rod from working loose, with material advantages in the operation of the piston rod, and applicable to and removable from the piston rod without in the least interfering with the nuts and the remaining parts coöperating with the rod.

Other objects and advantages will be more fully hereinafter specified in relation to details of structure which have been incorporated in the improved device to meet various contingencies present in piston rod constructions and the necessities of a practical swab.

The swab, embodying the features of the invention, consists essentially of two segmental members or sections which are movably connected and free to open, the members or sections being held normally closed and each provided with an inwardly opening waste receiving chamber, inner and outer flanges separated by the upper and lower walls of the chamber, one of the walls being perforate and the other imperforate, the walls being positioned inwardly a suitable distance from the edges of the flanges, and the perforate wall with the adjacent flange forming a lubricant receiving channel which may be conveniently supplied with lubricant by a feeding lip located in the outer wall. The inner opening formed by the inner flanges, when the members are closed, has such diameter that when the device is applied to a piston rod the spanner or limiting nuts of the latter will not obstruct ready access to the adjacent lubricant receiving channel. Furthermore, the perforate wall of the chamber of one member is on the same side of the device as the imperforate wall of the chamber of the remaining member, so that an effective means is provided for indicating the point of supply of the lubricant, and also the closed wall of each member disposed opposite the perforate wall of the same member prevents waste and the disadvantages incident to leakage or drip of the lubricant from the side of the device opposite that to which the lubricant is supplied.

The invention also consists in the details of construction and arrangement which will be more fully hereinafter specified.

In the drawings, Figure 1 is an elevation of a portion of an air pump showing the improved swab applied thereto. Fig. 2 is a plan view of the device. Fig. 3 is a cross sectional view. Fig. 4 is a perspective view of the device, the upper side in this figure being the lower side in Fig. 2.

The segments or members 1 and 2 are connected by a spring hinge 3, handles or projections 4 being located on opposite sides of the hinge and individually projecting from the said segments or members to facilitate opening the latter against the resistance of the spring included in the hinge organization. Each member is formed with an inwardly opening chamber 5, an inner flange 6, and an outer flange 7 provided with an outwardly flaring lip 8. The flanges are provided at both ends of each segment or member, and between them are segmental open chambers 9, the flanges 6 and 7 being terminally connected by webs 10 to complete the channels. The bottoms of the channels form the upper and lower walls of the chambers 5, the one wall 11 of each chamber having perforations, as at 12, and the opposite wall imperforate. The perforate wall of one channel is adjacent to or at the same end as the imperforate wall of the adjacent channel, to prevent leakage or waste of the lubricant, and to adapt the complete device to be applied with either end uppermost, and also to facilitate the supply of the lubricant to either end of the device. The channel having the imperforate bottom when uppermost will serve as an effective means for retaining the lubricant that may run back thereinto from the piston rod.

The chambers 5 are open at their extremities, and when the segments or members are in normally closed condition, said chambers terminally communicate and practically form a continuous or annular chamber. In the chambers suitable packing 14, such as waste or cord, is inserted and exposed through the inner openings of the chambers and slightly projected inwardly to effectively engage and lubricate the piston rod working through the swab.

The oil or lubricant supplied to either end of the swab, permeates the whole mass of packing and from the latter is fed economically and effectively to the piston rod, and at any time found necessary the uppermost channel having the perforate bottom may be supplied with oil or lubricant.

The swab also positively operates as a jam means for preventing the spanner or limiting nuts of the piston rod, as at 15, from working loose. To accomplish this important object, the vertical dimension of the swab is such as to fill the space between said nuts, and the latter are frictionally engaged by the inner and outer flanges 6 and 7 at opposite ends of the swab.

When the swab is interposed between the spanner nuts, the adjacent faces of the latter are caused to bear tightly against the edges of the flanges, the center swells of the nuts contacting with the inner flanges 6, thus preventing movement of the nuts and swab on the piston rod. The channels of the swab are not, however, obstructed by the nuts, and the lubricant can always be conveniently applied to the said channels by the aid of the lips 8, either before or after the swab is applied.

At any time the packing 14 may be withdrawn and new packing inserted in lieu thereof. It is not essential that any particular packing be adopted. Any material of an absorbent nature is adapted for the purpose.

The segments or members and handles or grip devices are preferably cast in one piece and suitable non-corrosive metal will be used. The dimensions and proportions may be varied at will without departing from the essential features of the invention, which are to have a readily reversible swab having perforate feeding channels in opposed positions at the ends, and the capability to serve as a locking means for the spanner nuts of a piston rod without requiring a particular construction of nut, or a special structure as a part of the swab to accommodate the nuts.

Having thus described the invention, what is claimed, is:

1. A reversible swab involving movably connected segmental members with packing therein and channels at opposite ends.

2. A reversible swab involving movably connected segmental members with packing therein and open channels at opposite ends, a part of the channels having perforate bottoms.

3. A reversible swab involving movably connected segmental members with packing therein and open channels at opposite ends, a part of the channels having perforate bottoms in reverse positions.

4. A reversible swab involving movably connected segmental members with inner and outer flanges at opposite ends forming lubricant receiving channels, the outer flanges having lips, and a packing held by and exposed through the inner portions of the members.

5. A reversible swab involving movably connected segmental members with inner and outer flanges and channels at opposite ends, and a packing in the members, combined with a piston rod having spanner nuts, the segments taking up the distance between the nuts and the latter prevented from working loose by the flanges.

6. A reversible swab having inner and outer flange means around a central bore and outer channel means at opposite ends, and a packing exposed through the bore, combined with a piston engaged by the swab and having spanner nuts, the swab taking up the distance between the nuts and the latter engaged by the flange means and leaving the channel means unobstructed.

7. A reversible swab having a packing therein and provided with exteriorly accessible perforate means at opposite ends in reverse positions for supplying lubricant to the packing.

8. A reversible swab having a packing therein and provided with lubricant receiving channels at opposite ends, the bottoms of a portion of the channels being perforate.

9. A reversible swab having a packing therein and provided with lubricant receiving channels at opposite ends, the bottoms of a portion of the channels being perforate and opposite closed bottoms of reverse channels.

In testimony whereof I have hereunto set my hand in presence of two subscribing witnesses.

JAMES W. EVENS.

Witnesses:
HERBERT LEVY,
NANNIE EWING.